United States Patent
Weiss et al.

[11] Patent Number: 5,921,577
[45] Date of Patent: Jul. 13, 1999

[54] CLAMPING DEVICE FOR A STEERING COLUMN

[75] Inventors: Jürgen Weiss; Wilfried Soyka, both of Herzogenaurach; Reiner Martin, Pommersfelden; Alexander Zernickel, Herzogenaurach; Stephan Gaertner, Hamburg; Thomas Kambies, Rosengarten; Michael Siemers, Hoisdorf; Reiner Scheu, Hülben, all of Germany

[73] Assignees: INA Walzlager Schaeffler KG; Daimler-Benz Aktiengesellschaft, both of Germany

[21] Appl. No.: 08/936,391

[22] Filed: Sep. 25, 1997

[30] Foreign Application Priority Data

Sep. 30, 1996 [DE] Germany .................. 196 40 196

[51] Int. Cl.⁶ .................................................. B62D 1/18
[52] U.S. Cl. ............................................. 280/775; 74/493
[58] Field of Search ................................ 280/775; 74/493

[56] References Cited

U.S. PATENT DOCUMENTS

| 5,088,767 | 2/1992 | Hoblingre et al. | 280/775 |
| 5,377,555 | 1/1995 | Hancock | 74/493 |
| 5,392,667 | 2/1995 | Courvoisier | 74/493 |

FOREIGN PATENT DOCUMENTS

| 0600700 | 6/1994 | European Pat. Off. . |
| 0592278 | 4/1994 | France . |
| 2696403 | 8/1994 | France . |
| 9300387 | 4/1993 | Germany . |

*Primary Examiner*—Paul N. Dickson
*Attorney, Agent, or Firm*—Bierman, Muserlian, and Lucas

[57] ABSTRACT

A clamping device for a steering column (6) which is guided in fixed mounting arms (4, 5) and comprises a tie bolt (7) which is arranged at right angles to the steering column (6), the tie bolt (7) extends between the two mounting arms (4, 5), there being arranged on one end of the tie bolt (7), between a thrust washer (11a) and the mounting arm (4), a clamping washer (12a) comprising clamping ramps (13a) on which rolling elements (14a) are supported while being guided in a retention disc (15a) mounted for rotation on the tie bolt (7), the retention disc (15a) can be rotated by means of a hand lever (19), and, depending on a direction of rotation of the retention disc (15a), the mounting arms (4, 5) effect a clamping or a releasing of the steering column (6), characterized in that the clamping device (1a) comprises a pot-shaped housing (2) which bears against the mounting arm (4) by a bottom (3) and encloses all the clamping means, the housing (2) is closed at one end by a thrust washer (11a), while the clamping ramp (13a) of the clamping washer (12a) has a contour which changes continuously from a zero position up to a clamped position.

10 Claims, 4 Drawing Sheets

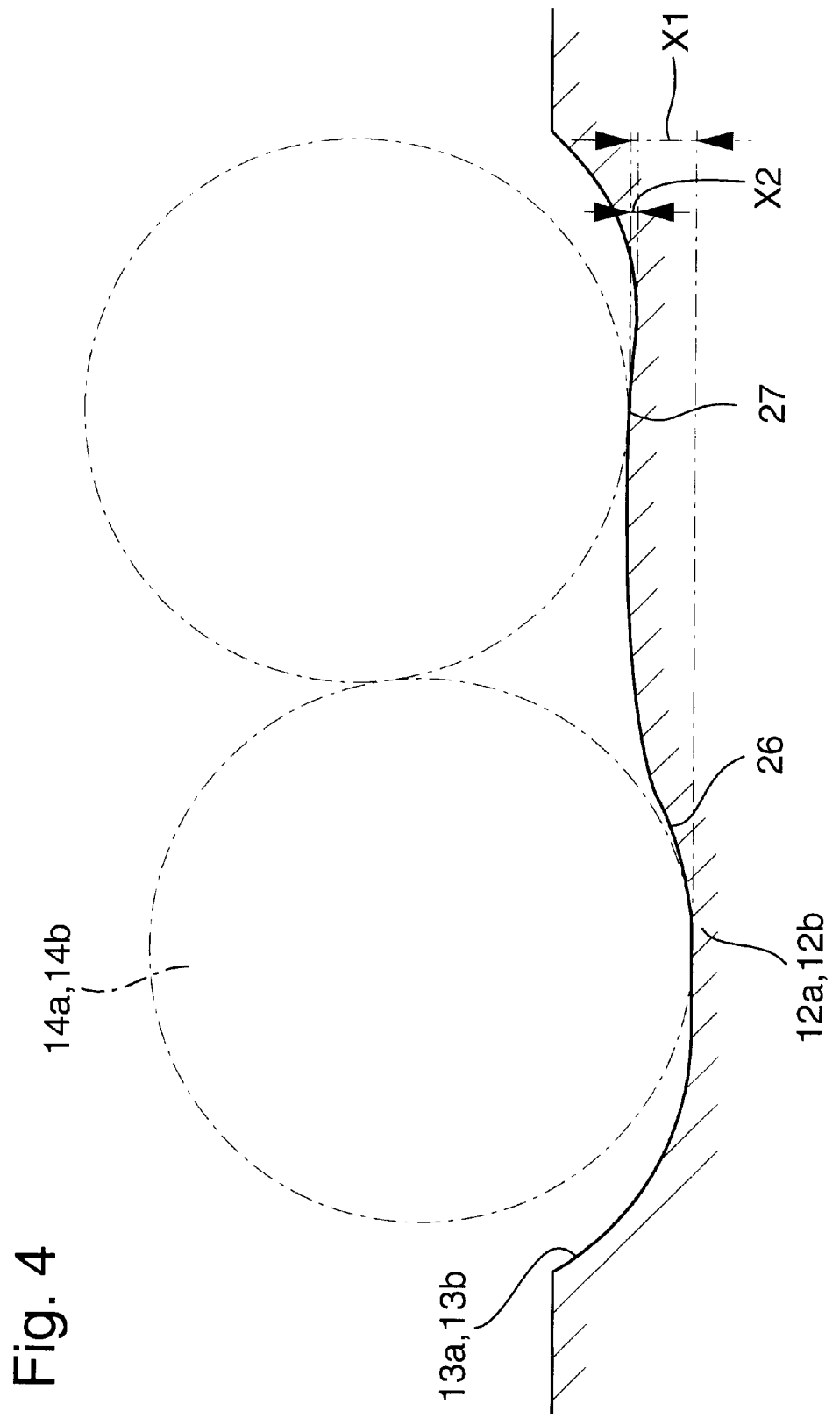

CLAMPING DEVICE FOR A STEERING COLUMN

FIELD OF THE INVENTION

The invention concerns a clamping device for the positional fixing of a motor vehicle steering column which is adjustable in length and/or inclination and is guided between mounting arms of a fixed bracket, said steering column comprising a tie bolt arranged at right angles thereto and extends between said mounting arms, one end of the tie bolt being retained on one of said mounting arms, while on an opposite end of the tie bolt which projects beyond the other of said mounting arms, there is arranged between a thrust washer and said other of said mounting arms, a clamping washer comprising clamping ramps for supporting clamping elements guided in a retention disc rotatably mounted on the tie bolt and adapted for being rotated by a manual hand lever, and depending on a direction of rotation of the retention disc, said mounting arms approach the steering column to effect clamping or move away from the steering column to release the steering column.

BACKGROUND OF THE INVENTION

Clamping devices for steering columns enabling an adjustment of the inclination of the steering column as well as an adjustment of its length i.e, of the distance between the driver and the steering wheel, improve driving comfort and permit an individual setting of the steering wheel position to meet the requirements of the respective driver of the vehicle.

Other clamping devices for adjusting the inclination and the height of the steering column are known which permit an optional adjustment for drivers of different height and enable the steering wheel position to be changed to suit different driving situations. Such clamping devices improve both comfort and safety and are therefore a useful contrivance.

Prior art clamping devices comprise a bracket fixed on the vehicle and having mounting arms between which the steering column is arranged. The clamping device for locking the steering column in position is disposed between or on these mounting arms. A positional fixing of the steering column is obtained by making the mounting arms approach the steering column and an adjustment thereof is possible when the mounting arms are made to move away from the steering column.

GB-A 21 13 164 describes a clamping device in which the clamping elements in the form of a stop element and a thrust washer engage the tie bolt. A locking element is arranged so that, on rotation relative to the tie bolt, the actuator of the locking element is displaceable between an effective locking position and an unlocking position. The actuator is integrally connected to an adjusting lever.

Another clamping device of the generic type concerned here is known from FR-A 26 96 403. In this device, a thrust washer fixed on the free end of the tie bolt and a clamping washer are fixed in position on the tie bolt which has a square profile. The further clamping means arranged between the thrust washer and the clamping washer are partly surrounded by a retention segment which has to be fixed on the mounting arms after the clamping device has been mounted.

A common feature of prior art clamping devices is a generally open and unprotected arrangement of the clamping means and a cost-intensive mounting because the device cannot be pre-assembled as a whole.

OBJECTS OF THE INVENTION

It is an object of the invention to provide a clamping device with a compact structure and an arrangement in which all the clamping means are protected.

A further object of the invention is to improve the functioning and the comfort of operation of the clamping device whose structural configuration should permit a pre-assembly.

These and other objects and advantages of the invention will become obvious from the following detailed description.

SUMMARY OF THE INVENTION

The clamping device of the invention comprises a pot-shaped housing through which the tie bolt is inserted and in which all the clamping means are lodged. This advantageously enables a pre-assembly of the clamping device which has then only to be placed on the tie bolt during the assembly of the vehicle. In the installed state, the housing is supported by a bottom in a rotationally fixed manner on one of the mounting arms, the end of the housing remote from this mounting arm being closed by a thrust washer. The housing which is completely closed except for one opening for the hand lever which serves to operate the clamping device, thus assures that the clamping means are protected from pollutants. The presence of such pollutants on the clamping ramp would lead to a malfunctioning of the device.

Further, to improve the reliability of functioning and the comfort of operation, the clamping ramp of the clamping washer is configured so that the contour of the clamping ramp of the clamping washer is configured so that the contour of the clamping ramp changes continuously between a zero position and a clamping position. By this, it can be assured that the adjusting force is almost constant over the entire angle of adjustment. Preferably, the clamping ramp comprises a first steeply ascending portion so that a defined pre-clamping is obtained already in a first phase of displacement. This is followed by a more gently ascending portion till the clamping position is reached. This clamping contour assures that no abrupt relaxation takes place on disengagement which would displace the hand lever of the clamping device into its end or zero position with a jerk accompanied by the danger of injury and a strong detrimental noise development. In addition, the steeply ascending portion facilitates the adjustment of the steering column into an ideal steering wheel position because the steering column is sufficiently clamped already after a short pivoting of the hand lever.

In a preferred embodiment of the invention, the retention disc which serves to guide the rolling elements is rotationally fixed in a bush which is adapted to rotate in the tie bolt. This leads to an improved guidance of the hand lever which is connected to the retention disc. The bush which projects axially beyond the retention disc on both sides thus prevents an axial stroke i.e., an axial displacement of the hand lever. The bush extends preferably from the bottom of the housing up to the thrust washer.

To avoid a detrimental bending load which would be transmitted from the clamping device to the steering column, the invention provides an arrangement of the clamping elements so that they are parallel to the longitudinal axis of the steering column in their clamping position. Thus, the clamping elements are arranged relative to the housing in a position such that, after the pivoting of the hand lever into the clamping position, the clamping elements are parallel to the longitudinal axis of the steering column. This position prevents the application of detrimental bending stresses to the clamping device and to the mounting arms and therefore assures a defined clamping position.

In an advantageous embodiment of the clamping ramp, the contour of the clamping ramp at first ascends steeply starting from a zero position up to a point of inflection which is followed by a gentle, almost constant ascent up to a further point of inflection from which the contour of the clamping ramp descends at least slightly up to the clamping position. Already with a smal angle of adjustment i.e, by a slight pivoting of the hand lever, this contour of the clamping ramp causes a pre-stress which holds the steering column in place. This improves the handling of the clamping device because the steering column is held in place already after a limited pivoting of the hand lever so that the optimal steering column position can then be adjusted. The hand lever is arranged preferably so that the largest possible lever arm is available for overcoming the steep portion of the clamping ramp. In a particularly advantageous configuration of the clamping ramp, the adjusting angle between the zero position and the clamping position of the rolling elements is 33°. The preferred lift provided by the invention measures 0.7 mm.

In a further embodiment of the invention, the clamping device comprises disc-shaped rolling elements which are guided in the retention disc on a guide axle. This configuration of the rolling elements has a positive effect on the friction force of the clamping device so that the force required for actuation is advantageously reduced. The rolling elements are supported on one side on the clamping ramp of the clamping washer and on the opposite side, on a race disc. The disc contour leads to well-defined friction conditions on the contact surface because almost identical speeds of rotation relative to the axis of rotation are obtained in the inner and outer end regions. Thus, the disc-shaped rolling element of the invention favors the force of actuation and thus has a positive effect on the comfort of operation and on the wear behavior of the clamping device of the invention.

To assist the retention of the clamping device in the clamping position, the invention further provides for the use of a clamping spring configured as a torsion spring. The clamping spring which acts in the closing direction of the clamping device is guided on the tie bolt and engages the race disc and the thrust washer. In addition to biasing the clamping device towards the clamping position, the spring also opposes an abrupt, unintentional releasing of the clamping device.

In a further advantageous embodiment of the invention, the housing is made of steel sheet by deep drawing without chip removal. This method of manufacture which is also economical for making large number of pieces, has the additional advantage that the weight of the housing can be optimized. To obtain a reliable prevention of rotation of the housing on the mounting arm, the housing comprises an axially projecting extension which, in the assembled state, engages into a corresponding recess of the mounting arm.

BRIEF DESCRIPTION OF THE DRAWINGS

The invention will now be described more closely with the help of two examples of embodiment which are shown in the four accompanying figures.

FIG. 4 is an enlarged representation of the clamping ramp of the clamping washer on which the rolling elements are supported.

DETAILED DESCRIPTION OF THE DRAWINGS

Figure 1:
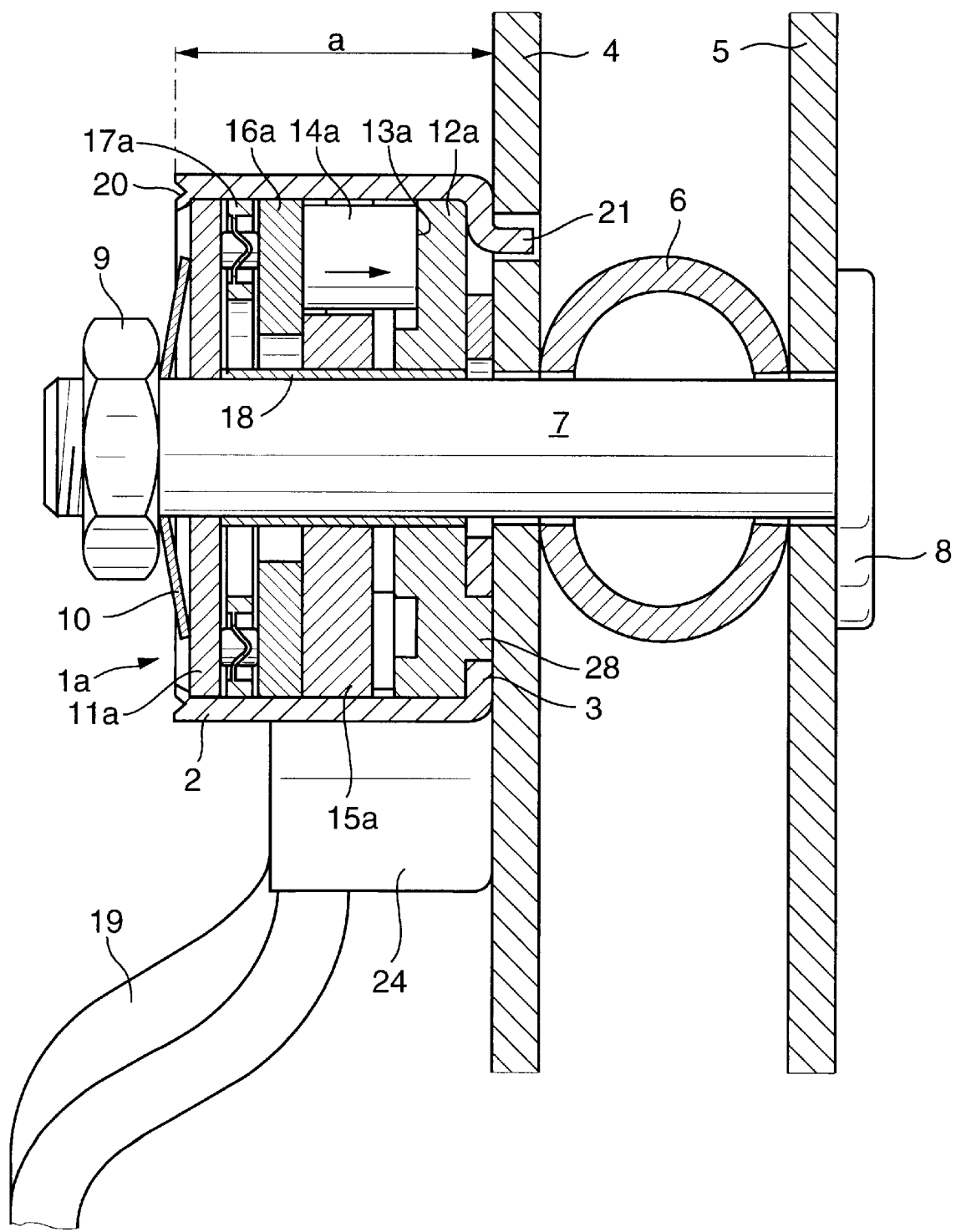
FIG. 1 is a longitudinal cross-section through one clamping device of the invention.

A clamping device identified at 1a in FIG. 1 comprises a pot-shaped housing 2 formed without chip removal from steel sheet and enclosing all the clamping means. The housing 2 is supported by a bottom 3 on a mounting arm 4 which together with a further, parallel mounting arm 5 forms a bracket for retaining a steering column 6. A rotation-preventing element 21 is provided between the housing 2 and the mounting arm 4. The clamping device 1a is arranged on a tie bolt 7 which is inserted through a transverse aperture of the steering column 6 to connect the mounting arms 4, 5 to each other. The tie bolt 7 is supported at one end on the mounting arm 5 by a stop 8. The other end of the tie bolt 7 which extends beyond the clamping device 1a comprises a thread on which a fixing nut 9 is arranged. A disc spring 10 bears against this fixing nut 9 while being supported on the other side on a thrust washer 11a which closes one end of the housing 2. However, the disc spring 10 can be omitted if, for example, the elastic internal stress of the mounting arms 4, 5 in the longitudinal direction of the tie bolt 7 is sufficient to neutralize the expansion of the clamping device for slackening the clamping device so that the steering column 6 can be adjusted. To limit the adjusting displacement of the thrust washer 11a, an inwardly oriented stopping device 20 is provided on the end of the housing 2.

The clamping means of the clamping device 1a is a clamping washer 12a which comprises clamping ramps 13a and supports rolling elements 14a. An anti-rotation device 28 is provided between the clamping washer 12a and the bottom 3. The circumferentially spaced rolling elements 14a are arranged in a retention disc 15a and are supported on one side on the clamping washer 12a and on the other side, on a race disc 16a. The clamping device 1a further comprises a thrust bearing 17a which is arranged between the race disc 16a and the thrust washer 11a. To obtain an exact guidance and prevent angular movement relative to the longitudinal axis of the tie bolt 7, the retention disc 15a, which is mounted for rotation on the tie bolt 7, comprises an integrally formed bush 18 arranged with slight play on the tie bolt 7 and extending axially from the bottom 3 up to the thrust washer 11a.

Method of operation of the clamping device

The clamping device 1a enables a continuous adjustment of the length and inclination of the steering column 6 which is arranged between the mounting arms 4 and 5. Adjustment is made possible by a rotation of the retention disc 15a with the help of a hand lever 19 which extends through a radial opening in the housing 2 and is integrally connected to the retention disc 15a. A housing wall 24 limits the range of pivot of the hand lever 19. FIG. 1 shows the steering column 6 in the clamped position. To release the steering column 6, the retention disc 15a is rotated and this causes an axial displacement of the rolling elements 14a on the clamping ramp 13a in the direction of the arrow. Assisted by the spring force of the disc spring 10, the components which are forced-locked on the rolling elements 14a i.e, the race disc 16a, the thrust bearing 17a and the thrust washer 11a are displaced synchronously with the rolling elements 14a. Due to the thus changing i.e., reducing spread of the clamping device, the biasing force exerted by the disc spring 10 on the clamping means of the clamping device 1a is also reduced, so that the mounting arms 4, 5 which are installed with pre-stress, move apart axially and the steering column 6 is released. To clamp the steering column 6, the retention disc 15a must be rotated in the opposite direction by means of the hand lever 19 so that a maximum spread of the clamping device is obtained.

Figure 2:
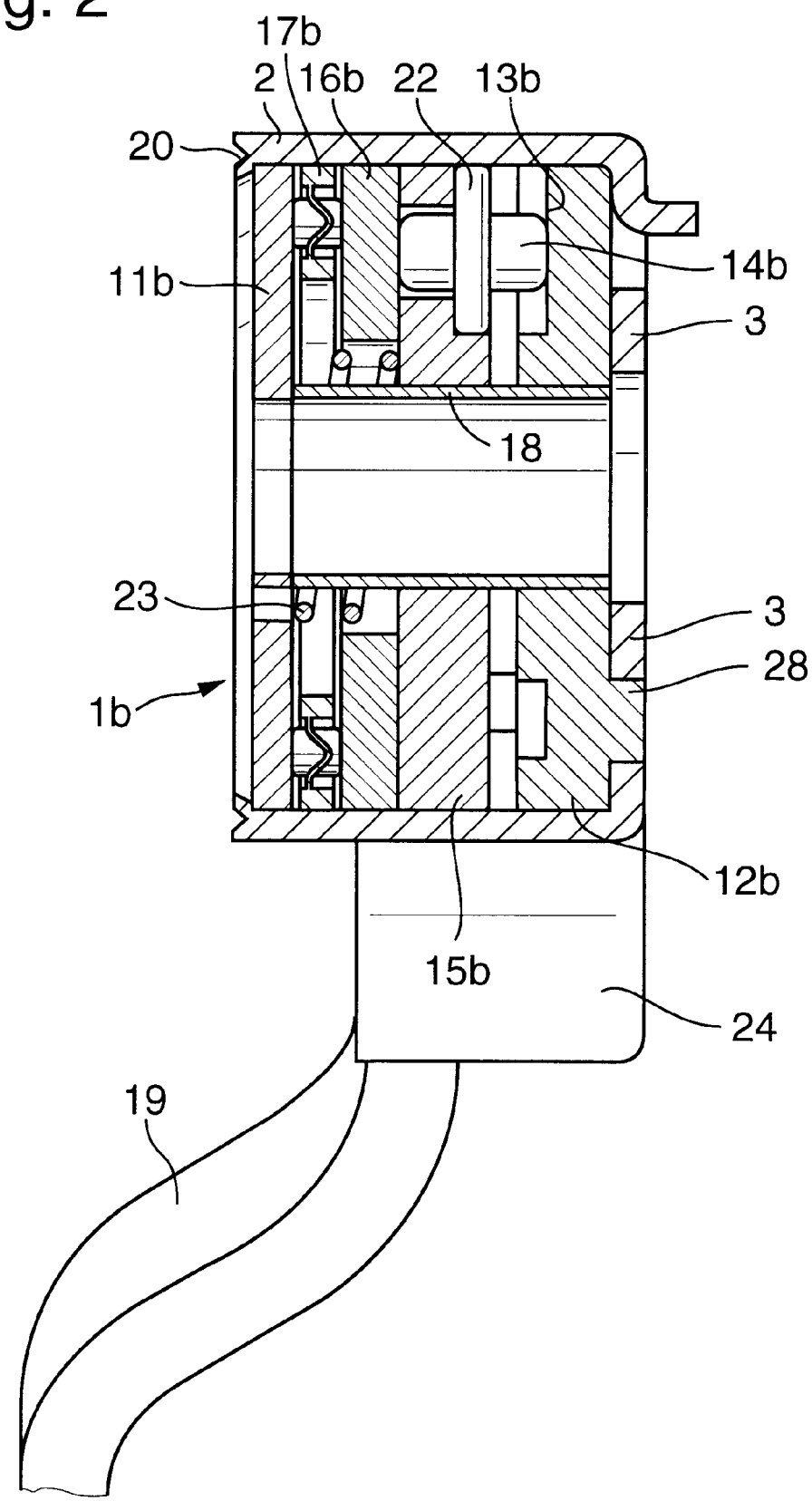
FIG. 2 shows an alternative embodiment of the clamping device of the invention which in contrast to the embodiment of FIG. 1, comprises a torsion spring.

A second embodiment of a clamping device 1b of the invention is shown in FIG. 2 in which the same reference numbers have been used as in FIG. 1. Parts differing from those of FIG. 1 with the index "a", bear the index "b" in FIG. 2. The method of operation of the clamping device 1b corresponds to that of the clamping device 1a of FIG. 1 so that reference may be made in this connection to the description of the method of operation of the first embodiment.

The clamping device 1b of FIG. 2 comprises disc-shaped rolling elements 14b mounted on an axle 22 in the retention disc 15b. The disc contour leads to a reduced contact surface of the rolling elements 14b on the clamping ramp 13b of the clamping washer 12b and on the race disc 16b. The clamping device 1b further comprises a torsion spring 23 which is arranged between the thrust washer 11b and the retention disc 15b and guided on the tie bolt 7. The torsion spring 23 is configured and arranged so as to give rise to a force component which acts in the closing direction of the clamping device 1b so that an abrupt relaxation of the clamping device 1b can be prevented.

Figure 3:
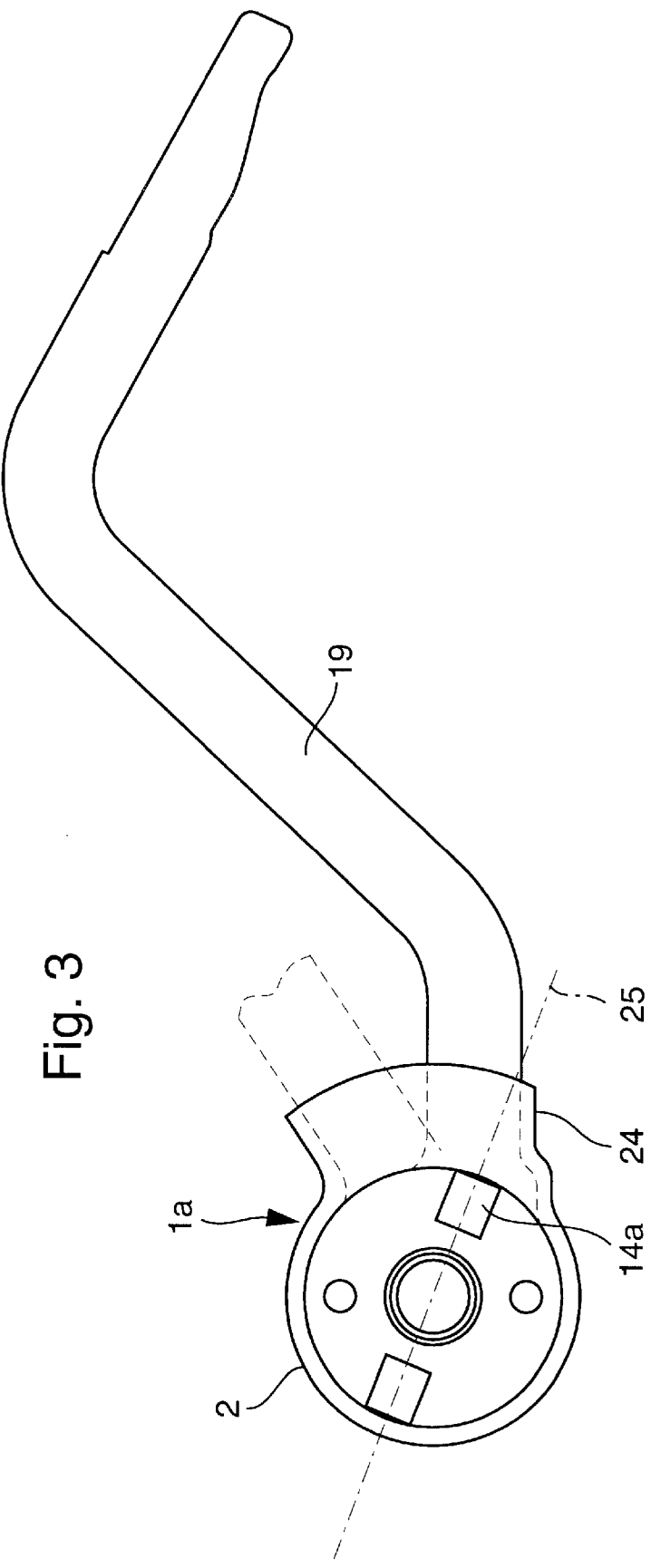
FIG. 3 is a view of the clamping device showing the clamping lever in a zero position and in a clamping position.

The view of the clamping device 1a depicted in FIG. 3 particularly shows the position of the clamping elements 14a in the clamping position relative to the steering column 6. The two rolling elements 14a which are arranged opposite each other come to be situated substantially parallel to the longitudinal axis 25 of steering column 6 in the clamping position. This positional correspondence prevents a detrimental bending load on the clamping device 1a which would occur if, in a clamped position, the longitudinal axis 25 extended at an angle to the longitudinal axis of the rolling elements 14a which could lead to ill-defined clamping conditions. FIG. 3 further shows the configuration of the hand lever 19 for which end stops for the zero position and the clamped position are provided on the housing wall 24. The dashed lines show the position of the hand lever 19 in a relaxed state of the clamping device 1a.

FIG. 4 is an enlarged representation showing the configuration of the clamping ramp 13a, 13b of the invention and a rolling element 14a, 14b in two different positions on the clamping ramp 13a, 13b. Starting from the zero position, the contour of the clamping ramp 13a, 13b is characterized by a first short steep ascent having a radius "R1" and extending up to a point of inflection 26 which is adjoined by a radius "R2" which flattens to form a transition into a radius "R3". A radius "R4" follows at the end of this portion of the ramp contour. The radius "R4" merges into a radius "R5" at the point of inflection 27 from which the contour again descends thus forming a difference of height "X2" relative to the point of inflection 27 in the region of the clamping position. This results in an over dead-center-function of the rolling elements 14a, 14b during which they are retained in a trough-like depression in the clamping position. Over the entire length of the clamping ramp 13a, 13b, which corresponds to the maximum angle of adjustment, a lift "X1" is obtained for the rolling elements 14a, 14b which causes a corresponding spread of the clamping device.

Various modifications of the clamping device of the invention may be made without departing from the spirit or scope thereof and it should be understood that the invention is intended to be limited only as defined in the appended claims.

What we claim is:

1. A clamping device arranged on a steering column for positional fixing the steering column which is adjustable in length and/or inclination and is guided between mounting arms (4, 5) of a fixed bracket, said clamping device comprising a tie bolt (7) arranged at a right angle to the steering column and extends between said mounting arms (4, 5), one end of the tie bolt (7) being retained on one (5) of said mounting arms, while on an opposite end of the tie bolt (7) which projects beyond the other mounting arm (4), there is arranged between a thrust washer (11a, 11b) and the other mounting arm (4), a clamping washer (12a, 12b) comprising clamping ramps (13a, 13b) for supporting rolling elements (14a, 14b) which are guided in a retention disc (15a, 15b) and mounted for rotation on the tie bolt (7) while being adapted to be rotated by a manual hand lever (19), and, depending on a direction of rotation of the retention disc (15a, 15b), said mounting arms (4, 5) approach the steering column to effect clamping or move away from the steering column to release the steering column wherein the clamping ramps (13a, 13b) have a contour which changes continuously starting from a zero position up to a clamping position, the clamping device (1a, 1b) comprises a pot-shaped housing (2) which is rotationally fixed on the other mounting arm (4) by a bottom (3), and the housing (2), through which the tie bolt (7) is inserted, encloses the clamping washer and is clamped by the thrust washer (11a, 11b).

2. A clamping device of claim 1 wherein the retention disc (15a, 15b) is guided for rotation on the tie bolt (7) by a bush (18) which extends axially beyond the retention disc (15a, 15b) on both sides.

3. A clamping device of claim 2 wherein the bush (18) extends from the bottom (3) up to the thrust washer (11a, 11b).

4. A clamping device of claim 1 wherein an arrangement of the rolling elements (14a, 14b) in the clamping position thereof extends parallel to a longitudinal axis (25) of the steering column (6).

5. A clamping device of claim 1 wherein, starting from a zero position, the clamping ramp (13a, 13b) of the clamping washer (12a, 12b) ascends at first steeply up to a first point of inflection (26) which is followed by a flattening ascent which extends up to a second point of inflection (27) from which the contour of the clamping ramp (13a, 13b) descends up to the clamping position, and, for positionally fixing the rolling elements (14a, 14b) in the clamping position, the clamping ramp (13a, 13b) comprises a difference of height X2 relative to the second point of inflection (27).

6. A clamping device of claim 1 wherein the rolling elements are disc-shaped and are guided on an axis (22) in the retention disc (15b).

7. A clamping device of claim 1 wherein a torsion spring (23) is arranged between the thrust washer (11b) and a race disc (16b) while being guided on the tie bolt (7).

8. A clamping device of claim 7 wherein the torsion spring (23) acts in a closing direction of the clamping device (1b).

9. A clamping device of claim 1 wherein the housing (2) is made of steel sheet by deep drawing without chip removal.

10. A clamping device of claim 1 wherein the housing (2) comprises a rotation-preventing device (21) in the form of an axial extension which engages into a corresponding recess of the other mounting arm (4).

* * * * *